United States Patent
Bertran Monfort et al.

(10) Patent No.: US 9,690,555 B2
(45) Date of Patent: Jun. 27, 2017

(54) OPTIMIZATION OF APPLICATION WORKFLOW IN MOBILE EMBEDDED DEVICES

(71) Applicant: International Business Machines Corporation, Armonk, NY (US)

(72) Inventors: Ramon Bertran Monfort, Bronx, NY (US); Pradip Bose, Yorktown Heights, NY (US); Alper Buyuktosunoglu, White Plains, NY (US); Chen-Yong Cher, Port Chester, NY (US); Hans M. Jacobson, White Plains, NY (US); William J. Song, Atlanta, GA (US); Karthik V. Swaminathan, Ossing, NY (US); Augusto J. Vega, Astoria, NY (US); Liang Wang, Charlottesville, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 157 days.

(21) Appl. No.: 14/753,685

(22) Filed: Jun. 29, 2015

(65) Prior Publication Data
US 2017/0068521 A1    Mar. 9, 2017

(51) Int. Cl.
*G06F 9/46* (2006.01)
*G06F 9/45* (2006.01)
*G06F 9/48* (2006.01)

(52) U.S. Cl.
CPC ............ *G06F 8/443* (2013.01); *G06F 9/4843* (2013.01)

(58) Field of Classification Search
CPC .................................................... G06F 9/4843
USPC ............................................................ 718/100
See application file for complete search history.

(56) References Cited

U.S. PATENT DOCUMENTS

| | | | |
|---|---|---|---|
| 5,260,874 A | 11/1993 | Berner et al. | |
| 7,971,073 B2 | 6/2011 | Hsu et al. | |
| 8,078,487 B2 | 12/2011 | Li et al. | |
| 8,413,150 B2* | 4/2013 | Lu | G06Q 10/0631 705/7.26 |
| 8,423,950 B2 | 4/2013 | Dettinger et al. | |
| 8,583,467 B1* | 11/2013 | Morris | G06Q 10/06 705/7.22 |

(Continued)

OTHER PUBLICATIONS

List of IBM Patents or Patent Applications Treated As Related; Date Filed: Jun. 29, 2015, 2 pages.

(Continued)

*Primary Examiner* — Andy Ho
(74) *Attorney, Agent, or Firm* — Cantor Colburn LLP

(57) ABSTRACT

An aspect includes optimizing an application workflow. The optimizing includes characterizing the application workflow by determining at least one baseline metric related to an operational control knob of an embedded system processor. The application workflow performs a real-time computational task encountered by at least one mobile embedded system of a wirelessly connected cluster of systems supported by a server system. The optimizing of the application workflow further includes performing an optimization operation on the at least one baseline metric of the application workflow while satisfying at least one runtime constraint. An annotated workflow that is the result of performing the optimization operation is output.

20 Claims, 13 Drawing Sheets

(56) References Cited

U.S. PATENT DOCUMENTS

| | | |
|---|---|---|
| 9,128,747 B2* | 9/2015 | Rajaraman .............. G06F 8/456 |
| 2011/0276977 A1* | 11/2011 | van Velzen ........... G06F 9/5038 |
| | | 718/104 |
| 2013/0041707 A1 | 2/2013 | Bose et al. |
| 2016/0378550 A1 | 12/2016 | Bertran Monfort et al. |

OTHER PUBLICATIONS

Shafik, et al: "Soft Error-Aware Voltage Scaling Technique for Power Minimization in Application-Specific Multiprocessor System on Chip"; JOLPE, VO.5, 2009; pp. 1.

Baoxian Zhao, et al., "Reliability-Aware Dynamic Voltage Scaling for Energy-Constrained Real-Time Embedded Systems", Department of Computer Science, George Mason University and University Texas at San Antonio, IEEE, 2008, pp. 633-639.

Liang Wang, et al., "Resilience and Real-Time Constrained Energy Optimization in Embedded Processor Systems", IBM T. J. Watson Research Center and University of Virginia, 2014, 7 pages.

Ying Zhang, et al., "A Unified Approach for Fault Tolerance and Dynamic Power Management in Fixed-Priority Real-Time Embedded Systems", IEEE Transactions on Computer-Aided Design of Integrated Circuits and Systems, vol. 25, No. 1, Jan. 2006, pp. 111-125.

* cited by examiner

Bit Mask Conversion Table 499

| App | Freq(GHz) | | 2.4 | 2.5 | ••• | 3.3 | 3.4 | ••• | 4.2 | 4.3 |
|---|---|---|---|---|---|---|---|---|---|---|
| 2dconv | 2.4 | ➡ | 1 | 0 | ••• | 0 | 0 | ••• | 0 | 0 |
| dwt53 | 3.3 | | 0 | 0 | ••• | 1 | 0 | ••• | 0 | 0 |
| histo | 4.2 | | 0 | 0 | ••• | 0 | 0 | ••• | 1 | 0 |

FIG. 4B

OPTIMIZATION OF APPLICATION WORKFLOW IN MOBILE EMBEDDED DEVICES

STATEMENT OF GOVERNMENT INTEREST

This invention was made with Government support under Contract No.: HR0011-13-C0022 awarded by Defense Advanced Research Projects Agency (DARPA). The Government has certain rights in this invention.

BACKGROUND

The present disclosure relates generally to optimizing application workflows, and more specifically, to the optimization of application workflows in an environment of mobile embedded devices.

Embedded systems utilize application workflows to operate, and a typical application workflow executed by an embedded system includes diverse application segments. Some segments of these workflows are more critical than other segments in terms of computational accuracy, speed, and reliability requirements. A key challenge in designing such application workflows is determining optimal or near-optimal voltage-frequency control setting (or other power setting) assignments to a processor of an embedded system across each application segment, such that the accuracy, speed, and reliability requirements are met.

For example, an unmanned aerial vehicle (UAV) is an embedded system that utilizes application workflows to control flight operations and mission-critical engagements. Because the processor of the UAV demands high performance (with real-time performance constraints) at low power and high reliability for flight operations and mission-critical engagements, designing application workflows includes determining optimal or near-optimal assignments of voltage-frequency control settings (or other power settings) for the processor of the UAV across each application segment to meet these low power and high reliability requirements.

A contemporary approach is to distribute application workflow computations to a cloud-based system. The distribution of application workflow computations attempts to balance the real-time processing needs of the workflow against the low power requirements of the embedded system. Yet, with the distribution of application workflow computations, the embedded systems lose the benefits of localized processing and can suffer from communication inadequacies between the cloud-based system and the embedded system. Additionally, the balance can be skewed by energy costs with respect to communication protocols.

SUMMARY

Embodiments include a method, system, and computer program product for optimizing an application workflow. The optimizing of the application workflow comprises characterizing the application workflow by determining at least one baseline metric related to an operational control knob of an embedded system processor. Note that the application workflow performs a real-time computational task encountered by at least one mobile embedded system of a wirelessly connected cluster of systems supported by a server system. The optimizing of the application workflow further comprises performing an optimization operation on the at least one baseline metric of the application workflow while satisfying at least one runtime constraint and outputting an annotated workflow. The annotated workflow is a result of the performing of the optimization operation.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4B depicts a bit mask conversion table according to an embodiment of the present invention;

DETAILED DESCRIPTION

Embodiments described herein relate to optimizing application workflows, and more specifically, to the optimization of application workflows in an environment of mobile embedded devices. This optimization is provided via a software framework for static preparation of application workflows and for simulated dynamic deployment of statically optimized application workflows, prior to actual deployment in a mobile embedded device environment.

The mobile embedded device environment, in general, includes a plurality of embedded devices with processors that wirelessly interconnect with a cloud-based system to perform cooperative computations with real-time constraints. For example, a plurality of embedded devices, such as unmanned aerial vehicles (UAVs), can wirelessly communicate to scan an image of the ground with cameras. Cooperative computations can be performed with a cloud-based system on the image to infer an actual ground status and recognize objects in real-time. Prior to the actual operation of scanning the ground, embodiments of the present invention maximize within real-time constraints (e.g., within a given time, a resilience/reliability metric, a maximum power, etc.) a performance and power efficiency (e.g., performance per watt; Giga-operation per watt, Giga-floating operation per watt, user defined operations, etc.) of the processors of the UAVs by static preparation and simulated dynamic deployment of the UAV workflows.

Figure 1:
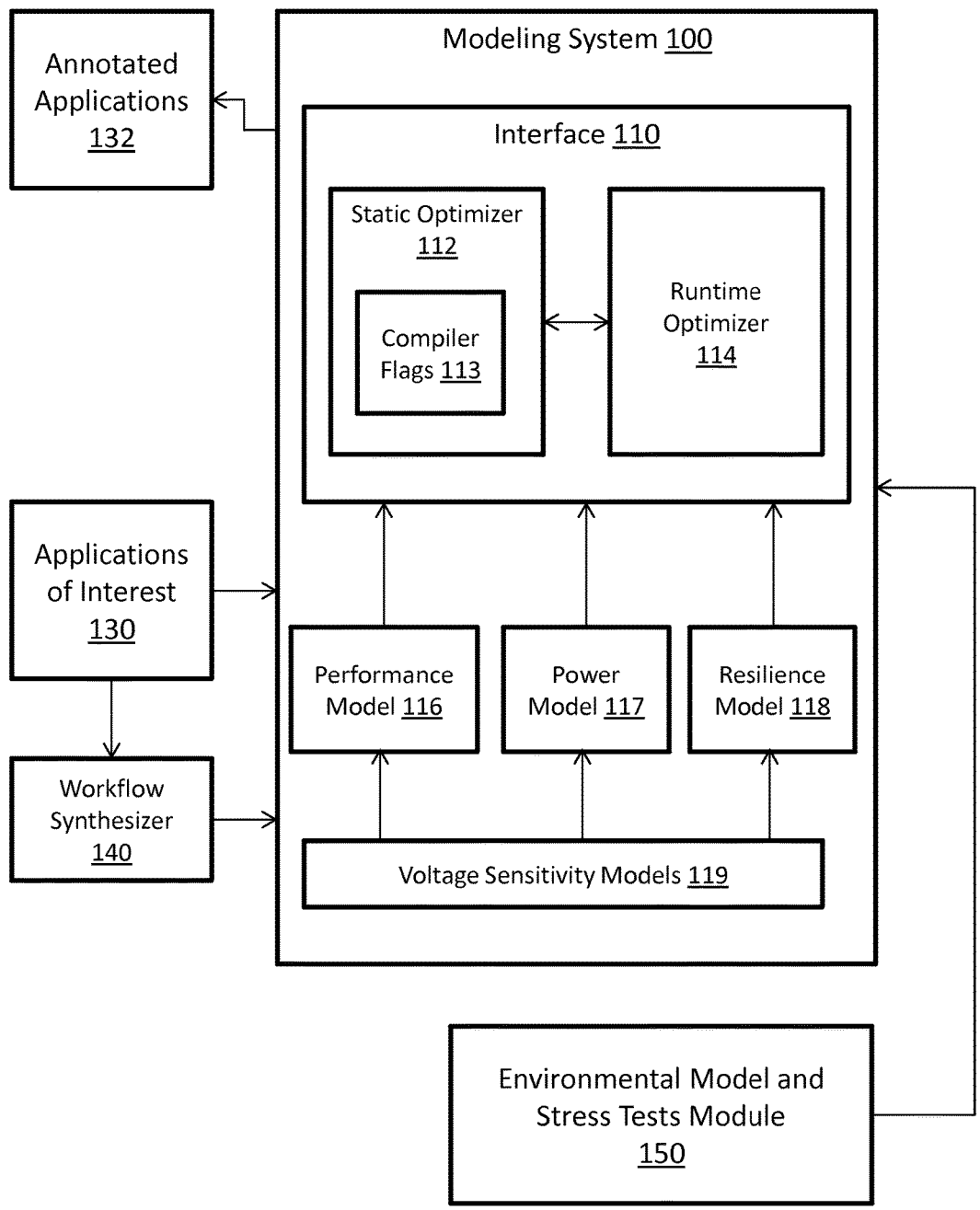
FIG. 1 depicts a system for optimizing an application workflow according to an embodiment of the present invention.

FIG. 1 depicts a modeling system 100 for optimizing an application workflow according to an embodiment of the present invention. The modeling system 100 resides in a computing device via any combination of software and hardware to perform the operations described herein. The modeling system 100 includes, via any combination of software and hardware, an interface 110 that includes a runtime optimizer 114 as well as a static optimizer 112 that includes a set of compiler flags 113. The modeling system 100 also includes via any combination of software and hardware, a performance model 116, a power model 117, a resilience model 118, and voltage sensitivity models 119. The modeling system 100 is also in communication with a workflow synthesizer 140 and an environmental model and stress tests module 150 to assist in the optimization of the applications of interest 130.

The interface 110 can be a resilience aware application programming interface. The resilience aware application programming interface can be a smart graphic user interface for entering commands and configurations by the user and for outputting visualizations of the modeling system 100. In this way, the interface 110 provides the medium through which a user can interact with the modeling system 100. The user can interact with two main entities: the static optimizer 112 and the runtime optimizer 114.

The static optimizer 112 identifies and determines baseline metrics for the application workflow and then modifies these baseline metrics to generate the annotated workflow. The static optimizer 112 includes widgets. The widgets can be set by the static optimizer 112 to change power performance characteristics of a processor of the target embedded system. For instance, the widgets are variable settings or knobs (such as, adaptive power performance control knobs) that control/scale a performance of a processor running an application workflow. The performance of the modeled (target) processor running the application can be determined by power, efficiency, and power over performance efficiency metrics, such as performance per watt; Giga-operation per watt, Giga-floating operation per watt, user defined operations, etc. For example, a performance can be scaled when a value of a widget that corresponds to voltage, frequency, a size of the structure, etc. is changed. In this way, an application workflow can be optimized by changing the value of a widget from a baseline to a desired value. The static optimizer 112 also includes the compiler flags 113 that also change performance, as well as power over performance efficiency, depending on a level of optimization that is used by a compiler of the modeling system 100.

The performance model 116, the power model 117, and the resilience model 118 separately capture how performance, power, and resilience (of the target embedded processor system) change over time when running an application workflow. The voltage sensitivity models 119 specify in analytical form the dependency between performance/power/resilience and voltage. For example, as a voltage setting of the static optimizer 112 is changed (i.e., as the voltage knob is adjusted), the changes in performance/power/resilience are captured by the voltage sensitivity models 119. These models can be software models that mimic a target processor for determining how an application workflow performs under different settings, or can be measurement-based models corresponding to native hardware that directly runs the application workflow.

The runtime optimizer 114 executes a dynamic deployment simulation of the statically prepared workflow. The dynamic deployment simulation mimics actual deployment conditions that test the performance and power efficiency of the processor executing the statically prepared workflow. During the dynamic simulation, on-the-fly optimization of the adaptive performance knobs is performed by the modeling system 100. For example, the runtime optimizer 114 emulates a deployment environment of the mobile embedded device environment and optimizes baseline metrics of the application workflow operating in this emulated deployment environment. Further, the runtime optimizer 114 can inject faults and per-application execution time deviations into the emulated deployment environment.

In another example, the runtime optimizer 114 statistically simulates runtime effects of a deployment environment by injecting uncertainties into the simulation. Uncertainties include unknown variations, events, or occurrences with the deployment environment (e.g., encounter an obstacle, adverse condition, adverse object, etc.) that affect the embedded system during actual deployment. Then, in spite of the optimized settings of the statically prepared workflow, a first application segment does not meet its deadline due to the injection of an unknown occurrence. In turn, the runtime optimizer 114 can further invoke an optimization on-the-fly to determine new settings for voltage and frequency so that the application workflow meets the deadline. Note that the on-the-fly optimization can cause the real-time constraints to be surpassed.

The applications of interest 130 are inputs of the modeling system 100. The annotated applications 132 are outputs of the modeling system 100 (e.g., the result of any application workflow being optimized or optimized workflow, a.k.a. annotated workflow). Note that the annotated application 132 can be re-tuned by the modeling system 100 to factor in simulated run-time uncertainties caused by the operational environment of said embedded system processor. Further, the optimization operation and/or the retuning operation can comprise a guard mechanism to minimize a number of failures during the optimization operation (e.g., each failure being inability by the respective operation to find an optimization solution within a given set of constraints).

An application workflow can be a single application, a linear workflow of a plurality of applications, a directed acyclic graph (DAG) workflow of a plurality of applications, a complex workflow, etc. The application workflow can also include segments, each of which can correspond to an application of the workflow and/or a portion of an application of the workflow. In this way, the modeling system 100 serves as an emulator that optimizes segments of an application workflow to output an optimized workflow or annotated workflow, which is ensured to work within the real-time constraints of an actual deployment environment.

Further, the workflow synthesizer 140 can be utilized to synthesize the applications of interest 130 into an application workflow for input into the modeling system 100. The environmental model and stress tests module 150 can be utilized to provide information and assumptions about the deployment environment to test and simulate the application workflow.

Figure 2:
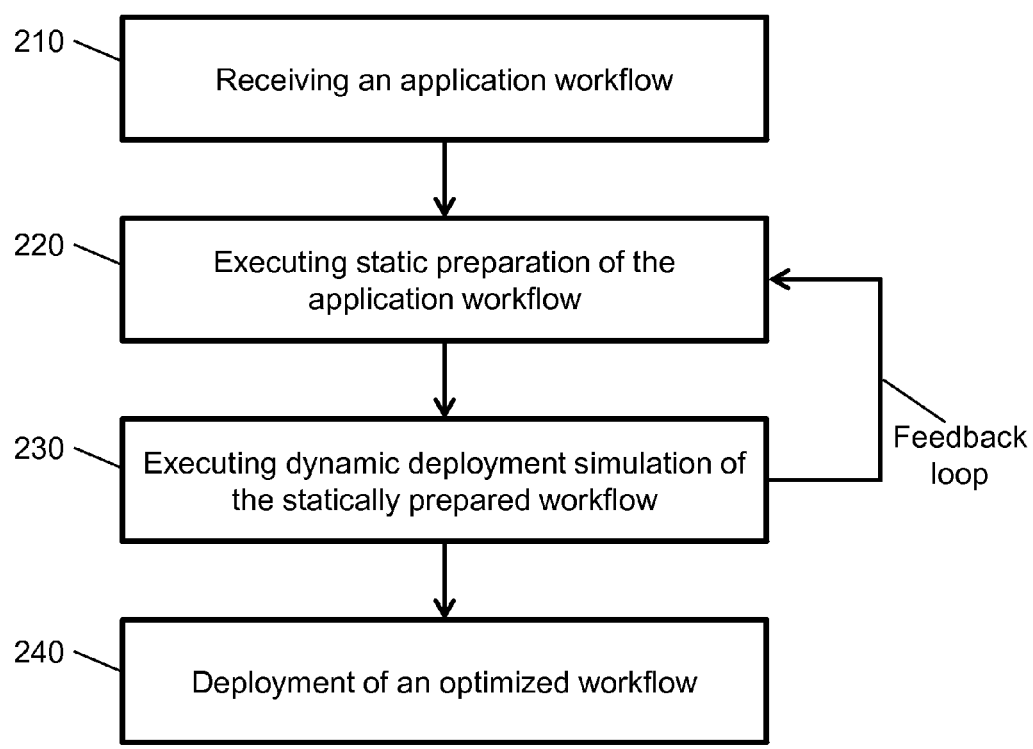
FIG. 2 depicts a process flow for optimizing an application workflow according to an embodiment of the present invention.

The optimization by the modeling system 100 will now be described with respect to FIG. 2, which depicts a process flow 200 according to an embodiment of the present invention. The process flow 200 begins at block 210, where the modeling system 100 receives (as the application workflow) the applications of interest 130 that once deployed will be executed by an embedded system within a deployment environment. The modeling system 100 will also receive the real-time constraints of the deployment environment that the application workflow must meet. In an example embodiment, a user may instruct the modeling system 100 to download the applications of interest 130 and/or utilize the workflow synthesizer 140 to synthesize arbitrary workflows from the applications of interest 130.

Next, at block 220, the static optimizer 112 of the modeling system 100 executes a static preparation of the application workflow. In the example embodiment, a user may invoke the static optimizer 112 on the applications of interest 130 and/or synthesized arbitrary workflows. When invoked, the static optimizer 112 characterizes the applications of interest 130 and/or synthesized arbitrary workflows in terms of performance, power, and resilience via a model (e.g., models 116-119) or by direct measurement of native hardware. Characterization comprises executing any given application to identify and determine performance, power, and resilience metrics of that application as a function of time. Native performance, power, and resilience variations over time are identified and determined by the static optimizer 112 to produce baseline characteristics or metrics. The static optimizer 112 can optimize these baseline metrics by defining processor settings. Note that the static optimizer 112 can make certain assumptions of what the deployment environment will be to optimize these variations.

For instance, the modeling system 100 defines processor settings with respect to each segment of the application workflow. To define processor settings, the modeling system 100 utilizes adaptive power-performance control knobs to change a performance and power efficiency of a processor with respect to the applications of interest 130 and/or synthesized arbitrary workflows. An example of an adaptive knob is a dynamic voltage and frequency scaling (DVFS) knob that adjusts (and sets) per application or segment the voltage and frequency of a processor of an embedded system towards more efficiency or higher performance. Other examples of knobs include, but are not limited to, dynamic voltage scaling (DVS) knobs, dynamic frequency scaling (DFS) knobs, power per-core power-gating (PCPG) knobs, and compiler optimization level knobs. The modeling system 100 maximizes these settings via the knobs within the real-time constraints of the deployment environment. Once the settings are identified and determined, a statically prepared workflow is produced for dynamic testing.

Next, at block 230, the runtime optimizer 114 of the modeling system 100 executes a dynamic deployment simulation of the statically prepared workflow. The dynamic deployment simulation mimics actual deployment conditions that test the performance and power efficiency of the processor executing the statically prepared workflow. During the dynamic simulation, on-the-fly optimization of the adaptive performance knobs is performed by the modeling system 100.

For instance, while the settings are statically optimized and set for the processor in block 220, the dynamic deployment simulation is permitted to deviate from the static settings to account for simulated unknown occurrences. By simulating various ideal conditions along with unknown occurrences, the modeling system 100 generates an optimized workflow. Thus, at block 240, the modeling system 100 deploys the optimized workflow (e.g., an annotated application 132).

Note that the process flow 200 includes a feedback loop, which provides as input information discovered during dynamic deployment simulation to subsequent static preparations (so that in the next iteration of executing a static preparation, the information can be used to build a more accurate workflow). For example, the annotated application 132 can be re-tuned by the modeling system 100 to factor in simulated run-time uncertainties caused by the operational environment of said embedded system processor. Further, the optimization operation and/or the retuning operation can comprise a guard mechanism to minimize a number of failures during the optimization operation.

Figure 3:
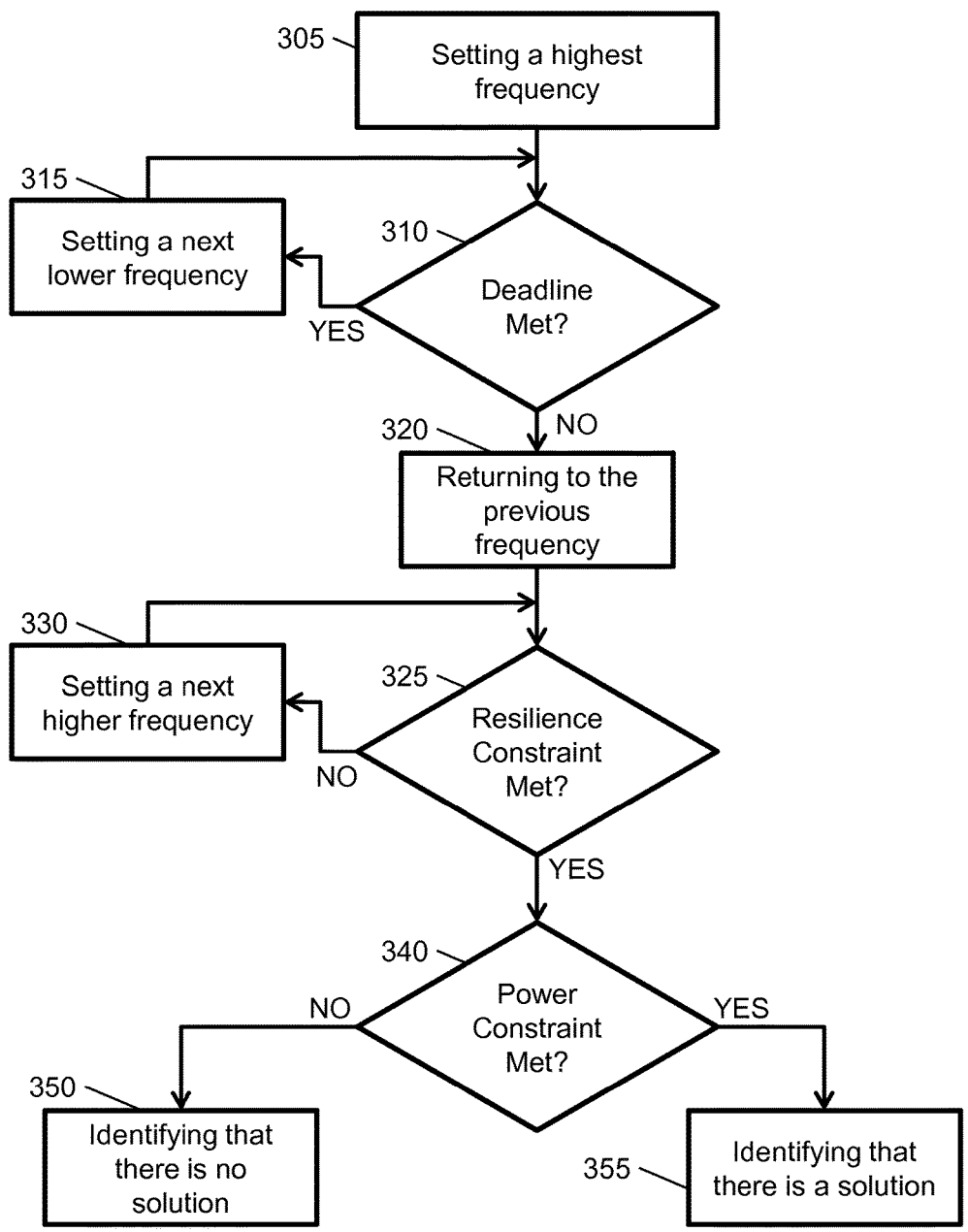
FIG. 3 depicts a process flow of a static optimization according to an embodiment of the present invention.

In view of the above, a baseline optimization of a single application (or application segment) will now be described with respect to FIG. 3. FIG. 3 depicts a process flow 300 of a static optimization according to an embodiment of the present invention. Particularly, the process flow 300 illustrates an example of scaling a frequency to maximize the performance per watt of a processor of an embedded system when executing the single application. The process flow 300 can be referred to as a SingleOpt heuristic (e.g., single optimization heuristic).

The process flow 300 beings at block 310, where the static optimizer 112 sets a DVFS knob to a highest frequency point for the single application. Then, at decision block 310, the static optimizer 112 determines if a runtime of the single application will meet a predetermined deadline with the frequency set to the highest point on the DVFS knob. If the single application does meet the deadline, then the process flow 300 proceeds to block 315 as indicated by the 'YES' arrow, where the static optimizer 112 sets the DVFS knob to a next lower frequency. Then, then the process flow 300 proceeds back to decision block 310, where the static optimizer 112 determines if a runtime of the single application will meet a predetermined deadline with the frequency set to the next point on the DVFS knob. This is repeated until a frequency is found that does not meet the predetermined deadline. When the frequency that does not meet the predetermined deadline is found, the process proceeds to block 320 as indicated by the 'NO' arrow. At block 320, the static optimizer 112 returns the DVFS knob to the previous frequency (i.e., the frequency that met the deadline).

At decision block 350, the static optimizer 112 determines if the single application will meet a resilience constraint. If the single application does not meet the resilience constraint, then the process flow 300 proceeds to block 330 as indicated by the 'NO' arrow, where the static optimizer 112 sets the DVFS knob to a next higher frequency. Then, the process flow 300 proceeds back to decision block 3325, where the static optimizer 112 determines if the resilience constraint is met. This is repeated until a frequency is found that does meet the resilience constraint. When the frequency that does meet the resilience constraint is found, the DVFS knob is set to the identified frequency and the process proceeds to decision block 340 as indicated by the 'YES' arrow.

At decision block 349, the static optimizer 112 determines if the single application will meet a power constraint at the identified frequency. If the single application does not meet the power constraint, then the process flow 300 proceeds to block 350 as indicated by the 'NO' arrow, where the static optimizer 112 identifies that there is no solution given the predetermined deadline, resilience constraint, and power constraint. If the single application does meet the power constraint, then the process flow 300 proceeds to block 355 as indicated by the 'YES' arrow, where the static optimizer 112 identifies that there is a solution given the predetermined deadline, resilience constraint, and power constraint.

Figure 4A:
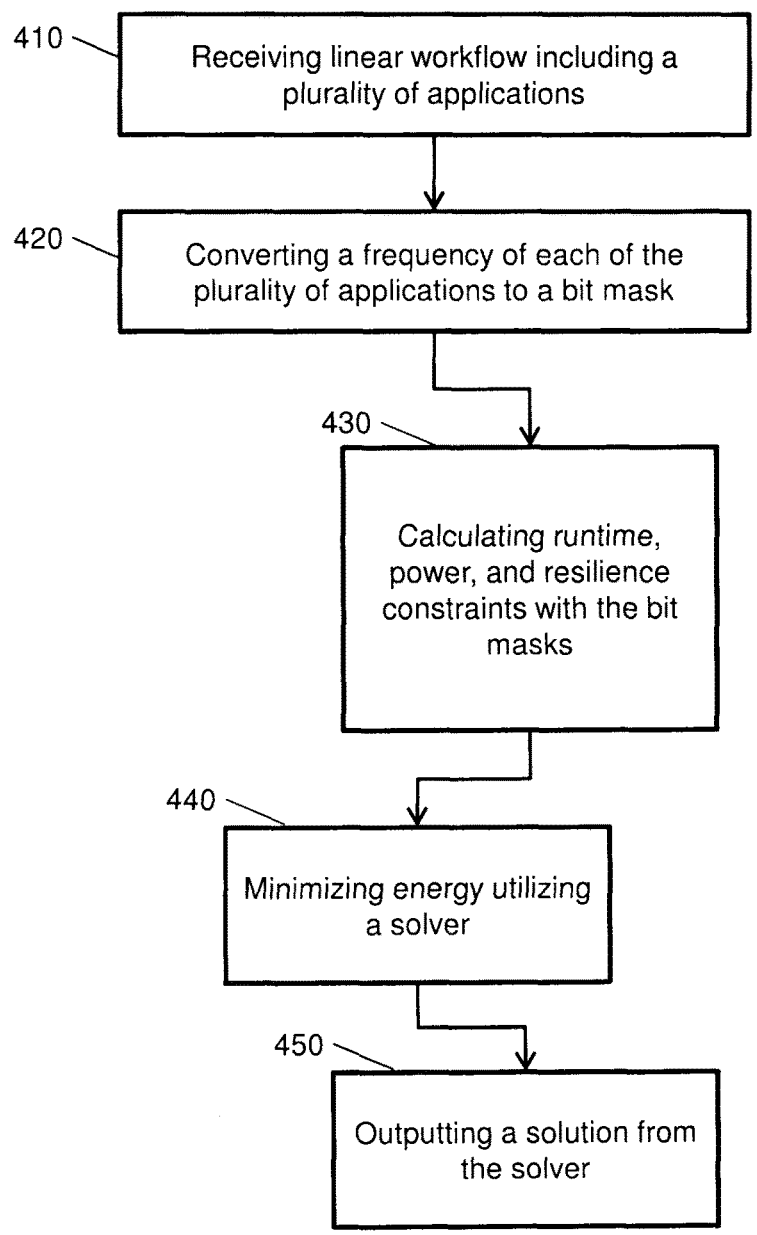
FIG. 4A depicts a process flow of a static optimization according to an embodiment of the present invention.

Another embodiment of a static optimization performed by the static optimizer 112 will now be described with respect to FIG. 4. FIG. 4 depicts a process flow 400 of a linear static optimization according to an embodiment of the present invention. Particularly, the process flow 400 illustrates an example of scaling frequencies of multiple applications to maximize the performance per watt of a processor of an embedded system. The process flow 400 can be referred to as a LinOpt heuristic (e.g., linear optimization heuristic).

The process flow 400 beings at block 410, where the static optimizer 112 receives a linear workflow including three applications. A linear workflow, in general, is a set of diverse application strung together sequentially. Next, at block 420, the static optimizer 112 converts a frequency of each of the applications in the linear workflow in to a bit mask M. In general, a bit mask can be multiple bits in a byte, nibble, word, etc., that can be set either on, off or inverted from on to off (or vice versa) to designate a frequency of an application. FIG. 4B, Table 499 (e.g., a Bit Mask Conversion Table) shows an example bit mask conversion of the linear workflow.

At block 430, the static optimizer 112 calculates runtime, power, and resilience constraints utilizing the bit masks. To calculate the runtime constraint, the static optimize 110 determines whether the sum of each runtime T multiplied by the bit mask M, at the particular i-th frequency, is less than the sum of the deadline as shown in equation 1. To calculate the power constraint, the static optimize 110 determines a power P for the i-th application in linear workflow according to equation 2. To calculate the resilience constraint, the static optimize 110 determines a resilience R based on the sum of each application's resilience Ri multiplied by the bit mask Mi according to equation 3.

With the runtime, power, and resilience constraints calculated, the process flow 400 proceeds to block 440, where the static optimizer 112 utilizes a solver to determine a minimized energy according to equation 4, where E is the energy for the i-th application in linear workflow. In one example, the solver calculates the lowest frequency per application of the linear workflow. At block 450, the solver of the static optimizer 112 outputs a solution with respect to the determination of the lowest frequency.

$$\Sigma T_i \cdot M_i \leq \text{Deadline} \qquad \text{Equation 1}$$

$$P_i \cdot M_i \leq P_{max} \qquad \text{Equation 2}$$

$$\Sigma R_i \cdot M_i \leq R = \Sigma \frac{\Sigma FIT_i \times T_i}{\Sigma T_i} \qquad \text{Equation 3}$$

$$\Sigma E_i \cdot M_i \qquad \text{Equation 4}$$

Figure 5:
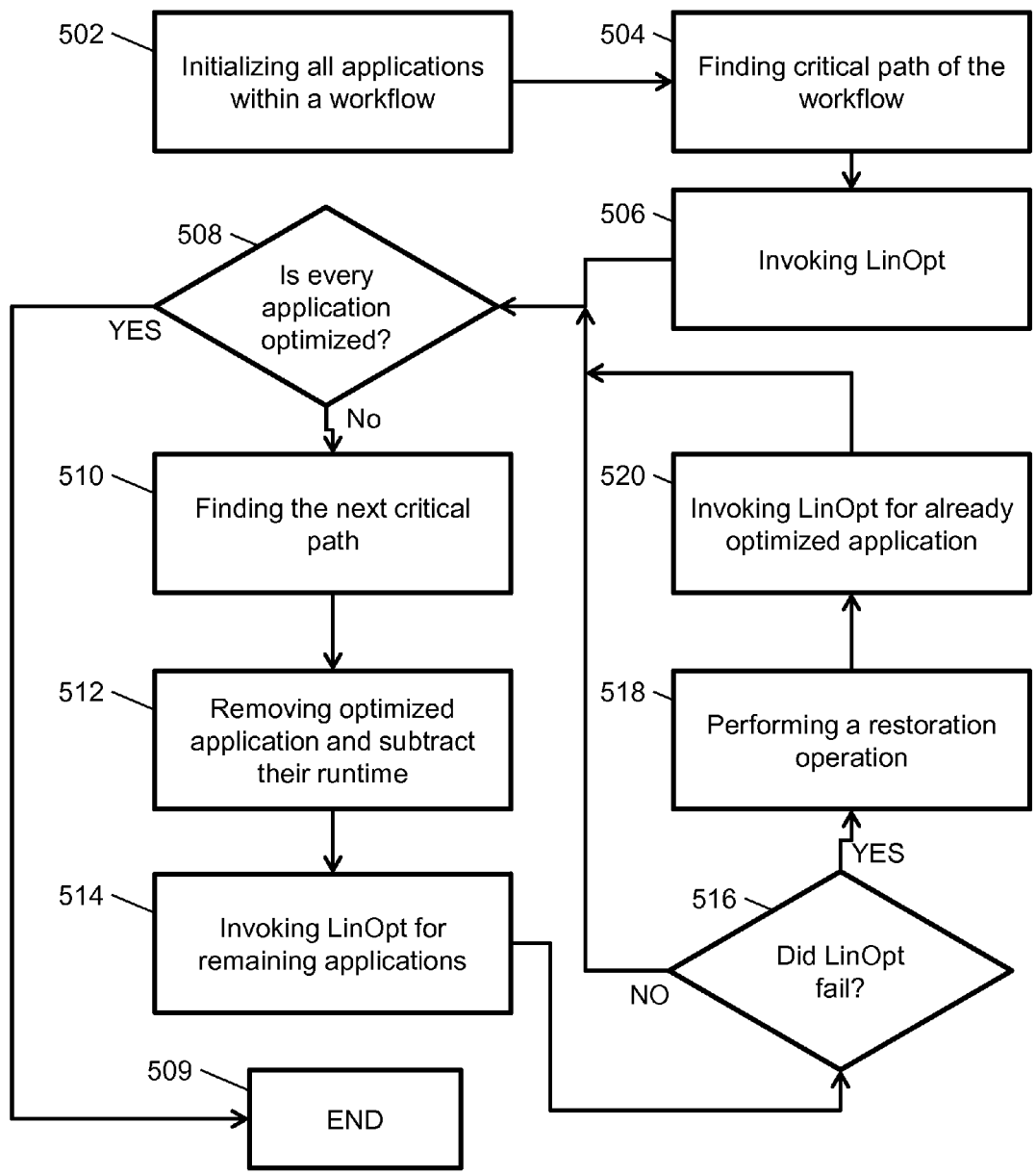
FIG. 5 depicts a process flow of a directed acyclic graph optimization according to an embodiment of the present invention.

Another embodiment of a static optimization performed by the static optimizer 112 will now be described with respect to FIG. 5. FIG. 5 depicts a process flow 500 of a DAG optimization by the static optimizer 112 that can include repeated invocations of the LinOpt heuristic according to an embodiment of the present invention. The process flow 500 can be referred to as a DAGOpt or DAGOpt-S heuristic (e.g., direct acyclic graph optimization or structured direct acyclic graph optimization).

The process flow 500 begins at block 502, where the static optimizer 112 initializes all applications within a DAG workflow. A DAG workflow is a directed graph with no directed cycles, formed by a collection of vertices/nodes and directed edges, where each edge connects one node to another. A node can correspond a segment of a workflow (e.g., an application of the workflow and/or a portion of an application of the workflow). Thus, in block 502, the static optimizer 112 initializes each node of the DAG workflow to the lowest frequency level so that each node is characterized by the execution time at that level.

Then, at block 504, the static optimizer 112 finds a first critical path of a first application of the DAG workflow. The first critical path is a sequence nodes connected by the edges (e.g., a sequence in which a subset of applications is performed within the DAG workflow). Then, at block 506, the static optimizer 112 invokes the LinOpt heuristic on the first critical path to optimally characterize each node of that first critical path.

At decision block 508, the static optimizer 112 determines whether every application of the workflow has been optimized. For example, the static optimizer 112 checks as to whether the LinOpt heuristic has been invoked on every node of the DAG workflow. If every node has been optimized, then the process flow 500 proceeds to block 509 as seen by the 'YES' arrow, where the static optimization of the DAG workflow ends. If every node has not been optimized, then the process flow 500 proceeds to block 510 as seen by the 'NO' arrow, where the static optimizer 112 finds the next critical path (e.g., second or subsequent critical path).

Next, at block 512, the static optimizer 112 removes any nodes from the second critical path that have been optimized and subtracts the corresponding runtimes from a total runtime. Then, at block 514, the static optimizer 112 invokes the LinOpt heuristic on the second critical path to optimally characterize the remaining nodes of that second critical path.

At decision block 516, the static optimizer 112 determines whether the LinOpt heuristic of block 512 failed. If the LinOpt heuristic has not failed, then the process flow 500 returns to block 508 as seen by the 'NO' arrow, where the static optimizer 112 again determines whether every application of the workflow has been optimized.

If the LinOpt heuristic has failed, then the process flow 500 proceeds to block 518 as seen by the 'YES' arrow, where the static optimizer 112 performs a restoration operation. The restoration returns the nodes corresponding to the failed LinOpt to their pre-failure state. Then, at block 520, the static optimizer 112 invokes the LinOpt heuristic on the already optimally nodes to adjust their characterization so that no future LinOpt heuristic failures occur. Next, the process flow 500 returns to block 508, where the static optimizer 112 again determines whether every application of the workflow has been optimized.

Figure 6:
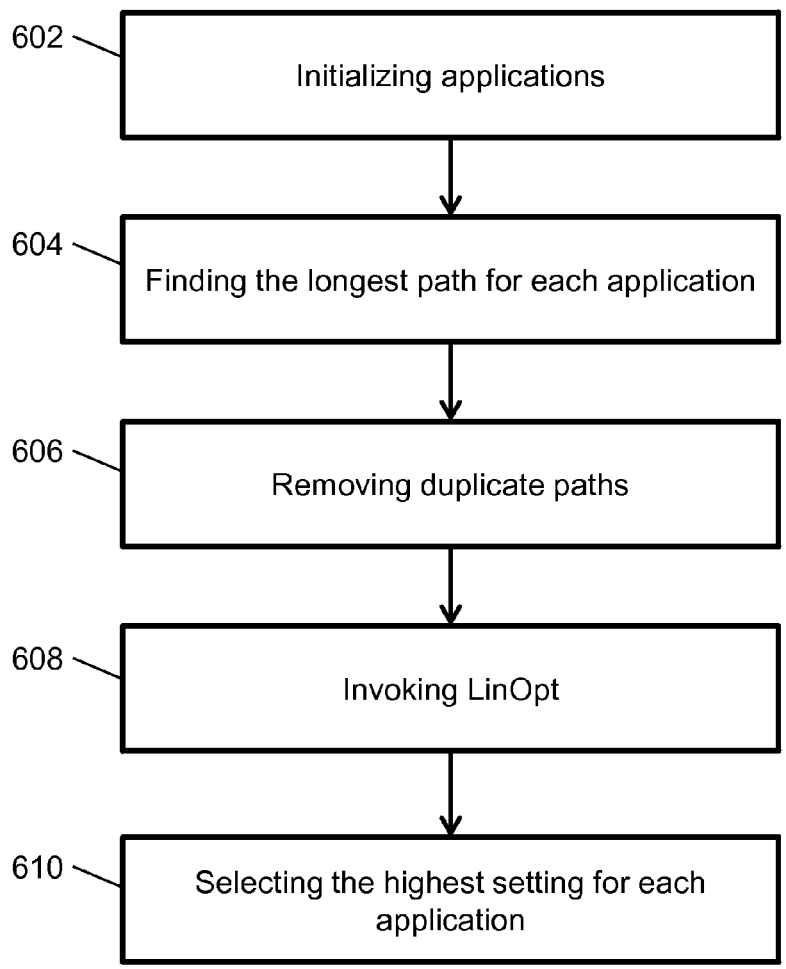
FIG. 6 depicts a process flow of a parallel directed acyclic graph optimization according to an embodiment of the present invention.

Another embodiment of a static optimization performed by the static optimizer 112 will now be described with respect to FIG. 6. FIG. 6 depicts a process flow 600 of a parallel directed acyclic graph optimization by the static optimizer 112 according to an embodiment of the present invention. The process flow 600 can also be referred to as a DAGOpt or DAGOpt-P heuristic (e.g., direct acyclic graph optimization or parallel direct acyclic graph optimization).

The process flow 500 begins at block 602, where the static optimizer 112 initializes all applications with a DAG workflow. Then, at block 604, the static optimizer 112 finds a longest path for each application of the DAG workflow to create a set of longest paths. At block 606, the static optimizer 112 removes all duplicate paths from a set of longest paths. With all duplicates removed, the static optimize, as shown in block 608, invokes the LinOpt heuristic on the remaining paths to optimize each path. Next, at block 610, the static optimizer 112 selects the highest setting for each application.

Figure 7:
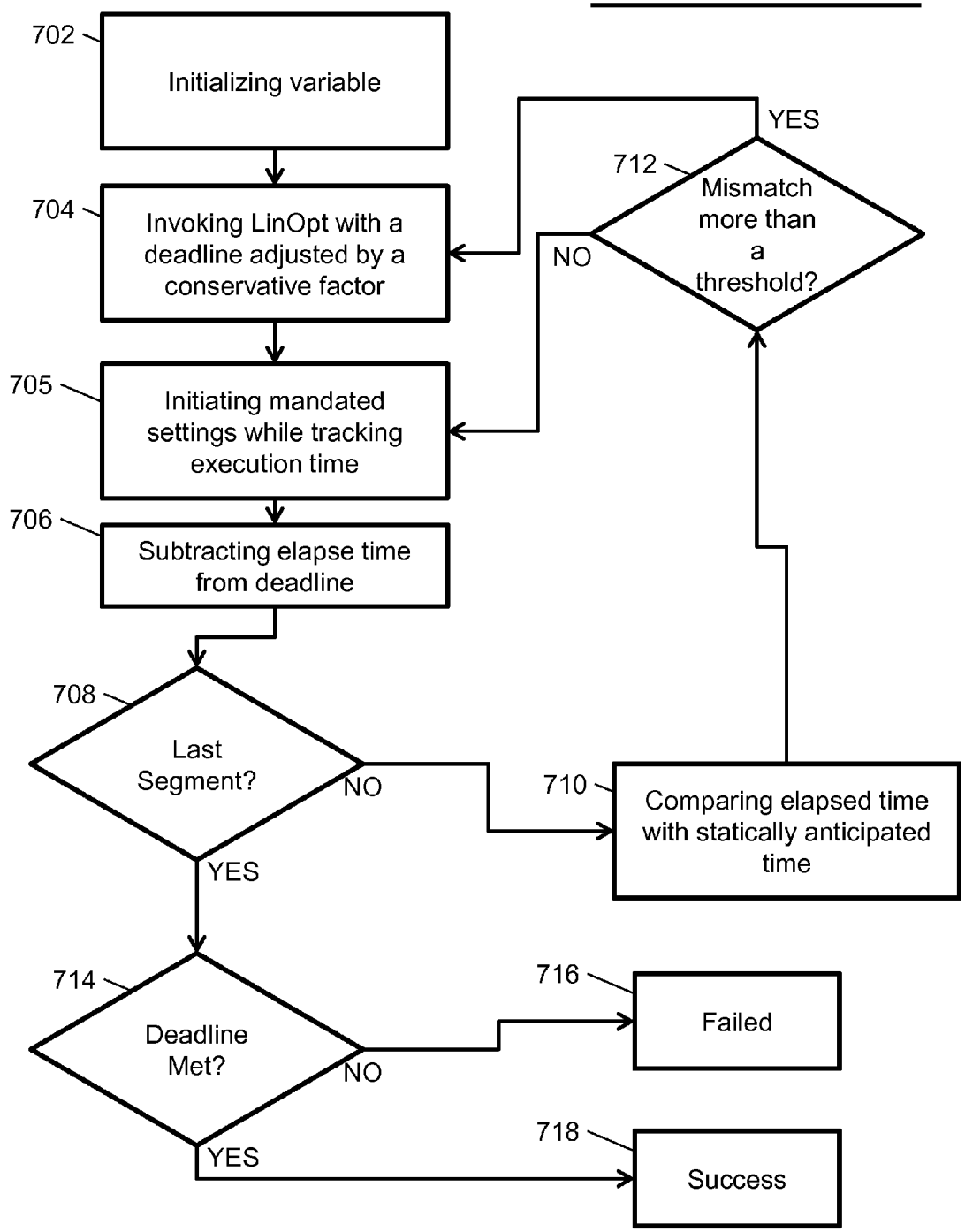
FIG. 7 depicts a process flow of a dynamic optimization according to an embodiment of the present invention.

In view of the above, an embodiment of a dynamic optimization performed by the runtime optimizer 114 will now be described with respect to FIG. 7. In general, the runtime optimizer 114 utilizes a deadline target against which the application workflow is measured. The dynamic optimization models time variations during execution of the application workflow as conditions change. The aim of modeling the time variations is to identify whether a real execution time of the application workflow is longer than the estimated deadline. In view of this aim, FIG. 7 depicts a process flow 700 of a dynamic optimization of an application workflow by the runtime optimizer 114 according to an embodiment of the present invention.

The process flow 700 begins at block 702, where the runtime optimizer 114 initializes variables for the dynamic optimization. Then, in block 704, the runtime optimizer 114 invokes the LinOpt heuristic with a deadline adjusted by a conservative factor. The conservative factor accounts for delays in execution. At block 705, the runtime optimizer 114, for jth segment, initiates with the optimization mandated DVFS settings while keeping track of an actual execution time. At block 706, the runtime optimizer 114 subtracts the elapsed time from the deadline. In the dynamic optimization scheme, the initial LinOpt invocation supplies statically mandated voltage-frequency setting, but the actual "elapsed time" is obtained by some sort of dynamic simulation of the actual deployed environment. For example, the "actual" elapsed time is simulated by adding a random adder (plus or minus) to the statically calculated time. The random adder can be obtained from a user-specified probability distribution function.

At decision block 708, the runtime optimizer 114 determines whether the last segment has been processed. If the last segment has not been processed, then the process flow 700 proceeds to block 710 as seen by the 'NO' arrow, where the runtime optimizer 114 compares elapsed time with statistically anticipated time. Then, at decision block 712, the runtime optimizer 114 determines whether there is a mismatch between the calculated execution time from blocks 704-706 and a statically anticipated time, threshold, or deadline. If there is a mismatch, then the process flow 700 proceeds to block 704 as seen by the 'YES' arrow, where the runtime optimizer 114 again invokes the LinOpt heuristic with a deadline adjusted by a conservative factor. If there is no mismatch, then the process flow 700 proceeds to block 705 as seen by the 'NO' arrow, where the runtime optimizer 114 again invokes the LinOpt heuristic with a deadline adjusted by a conservative factor.

Returning to decision block 708, if the last segment has been processed, then the process flow 700 proceeds to block 714 as seen by the 'YES' arrow, where the runtime optimizer 114 determines if the application workflow meets the deadline. If the deadline is not met, then the process flow 700 proceeds to block 716 as seen by the 'NO' arrow, where the runtime optimizer 114 identifies the dynamic optimization as failed. If the deadline is met, then the process flow 700 proceeds to block 718 as seen by the 'YES' arrow, where the runtime optimizer 114 identifies the dynamic optimization as a success.

Figure 8:
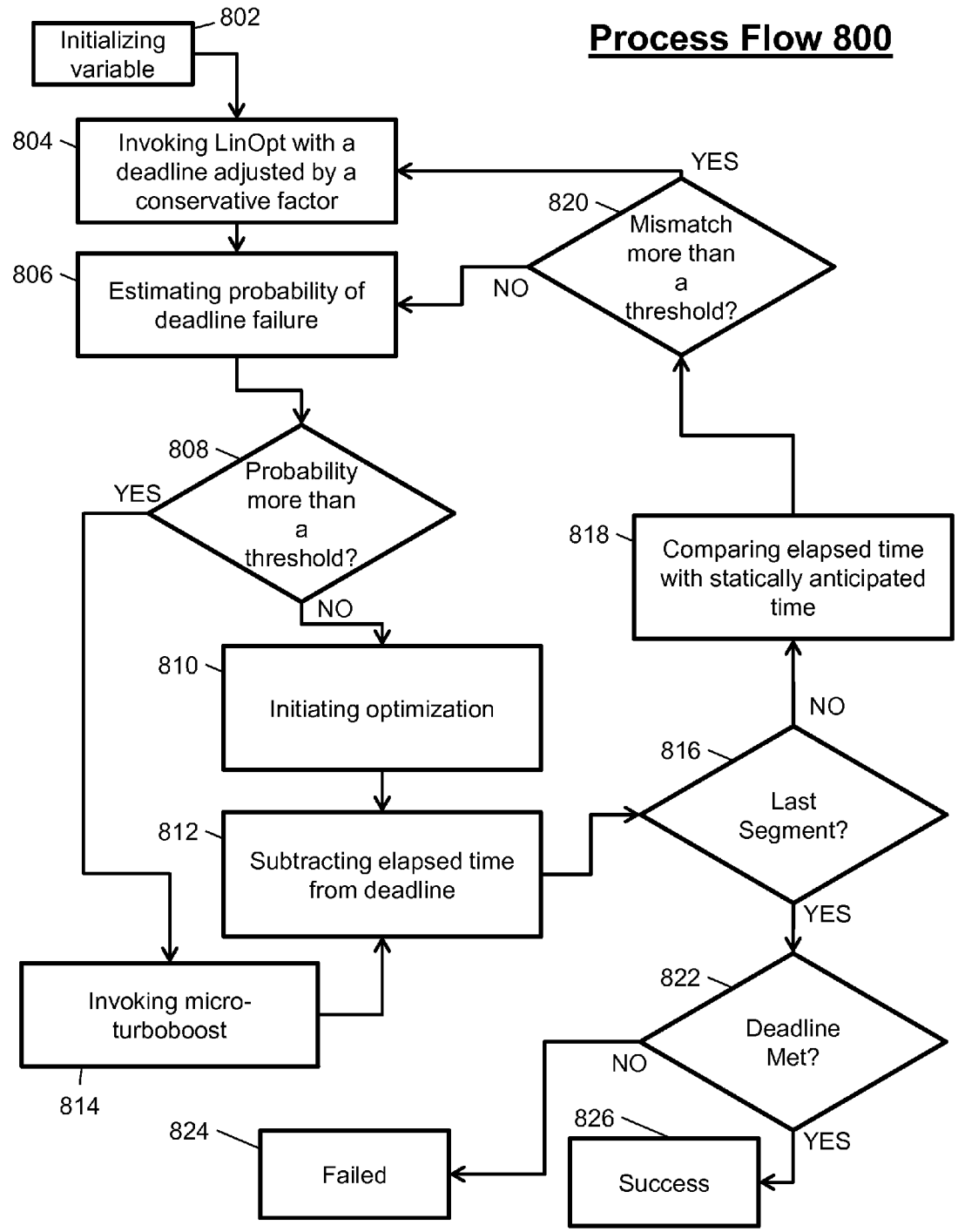
FIG. 8 depicts a process flow of a dynamic optimization with a turbo-boost feature according to an embodiment of the present invention.

Another embodiment of a dynamic optimization performed by the runtime optimizer 114 will now be described with respect to FIG. 8. FIG. 8 depicts a process flow 800 of a dynamic optimization by the runtime optimizer 114 with a turbo-boost feature according to an embodiment of the present invention.

The process flow 800 begins at block 802, where the runtime optimizer 114 initializes variables for the dynamic optimization. Then, in block 804, the runtime optimizer 114 invokes the LinOpt heuristic with a deadline adjusted by a conservative factor. The conservative factor accounts for delays in execution. At block 806, the runtime optimizer 114 estimates a probability of deadline failure.

At decision block 808, the runtime optimizer 114 determines whether the probability of deadline failure is grater that a threshold. If the probability of deadline failure is not grater that a threshold, then the process flow 800 proceeds to blocks 810 and 812 as seen by the 'NO' arrow, where the runtime optimizer 114 initiates optimization and subtracts the elapsed time from the deadline.

If the probability of deadline failure is greater that a threshold, then the process flow 800 proceeds to block 814 as seen by the 'YES' arrow, where the runtime optimizer 114 performs a turbo-boost operation before proceeding to block 812. The turbo-boost operation or "mode" comprises boosting of voltage-frequency levels during short intervals. This voltage-frequency level boost enables the application workflow to meet of real-time deadline controls, while violating hard fail rate (or maximum power) constraints for those short intervals. Yet, the turbo-boost operation does not affect long-term endurance or reliability targets of the clustered mobile embedded systems (or any individual embedded system thereof).

After the elapsed time is subtracted, the runtime optimizer 114 determines whether the last segment has been processed at decision block 816. If the last segment has not been processed, then the process flow 800 proceeds to block 818 as seen by the 'NO' arrow, where the runtime optimizer 114 compares elapsed time with statistically anticipated time. Then, at decision block 820, the runtime optimizer 114 determines whether there is a mismatch between the calculated execution time from blocks 810 and 812 and a statically anticipated time, threshold, or deadline. If there is a mismatch, then the process flow 800 proceeds to block 804 as seen by the 'YES' arrow, where the runtime optimizer 114 again invokes the LinOpt heuristic with a deadline adjusted by a conservative factor. If there is no mismatch, then the process flow 800 proceeds to block 806 as seen by the 'YES' arrow, where the runtime optimizer 114 estimates a probability of deadline failure.

Returning to decision block 816, if the last segment has been processed, then the process flow 800 proceeds to block 822 as seen by the 'YES' arrow, where the runtime optimizer 114 determines if the application workflow meets the deadline. If the deadline is not met, then the process flow 800 proceeds to block 824 as seen by the 'NO' arrow, where the runtime optimizer 114 identifies the dynamic optimization as failed. If the deadline is met, then the process flow 800 proceeds to block 826 as seen by the 'YES' arrow, where the runtime optimizer 114 identifies the dynamic optimization as a success.

Figure 9:
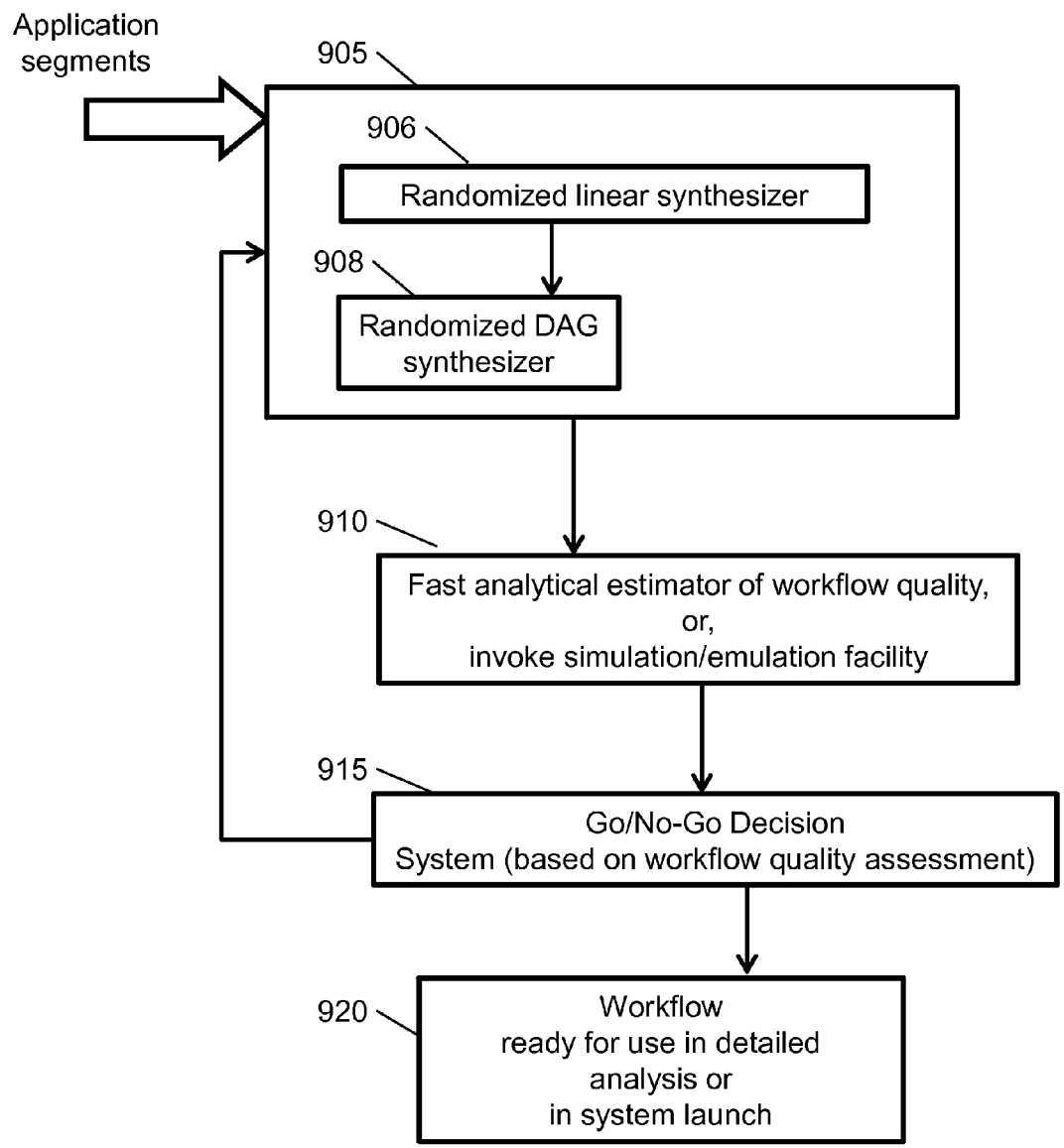
FIG. 9 depicts a process flow of a synthesizer according to an embodiment of the present invention.

In view of the above, an embodiment of a synthetization performed by the workflow synthesizer 140 will now be described with respect to FIG. 9. FIG. 9 depicts a process flow 900 of a synthesizing by the workflow synthesizer 140 according to an embodiment of the present invention. The process flow 900 begins at block 905 where application segments are received by the workflow synthesizer 140. Once received, the workflow synthesizer 140 performs a randomized linear synthesizing (block 906) and a randomized DAG synthesizing (block 908). Then, at block 910, the workflow synthesizer 140 performs a fast analytical estimator of workflow quality or invokes simulation/emulation. Next, at block, the workflow synthesizer 140 performs go/no-go decision based on workflow quality assessment. At this time, it the decision was a no-go, the process flow may proceed to block 905. Otherwise, the application segments that are synthesized are now ready for use by the model system 100.

Embodiments of the present invention may be a system (e.g., implemented on a cloud computing environment), a method, and/or a computer program product, or a model thereof.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
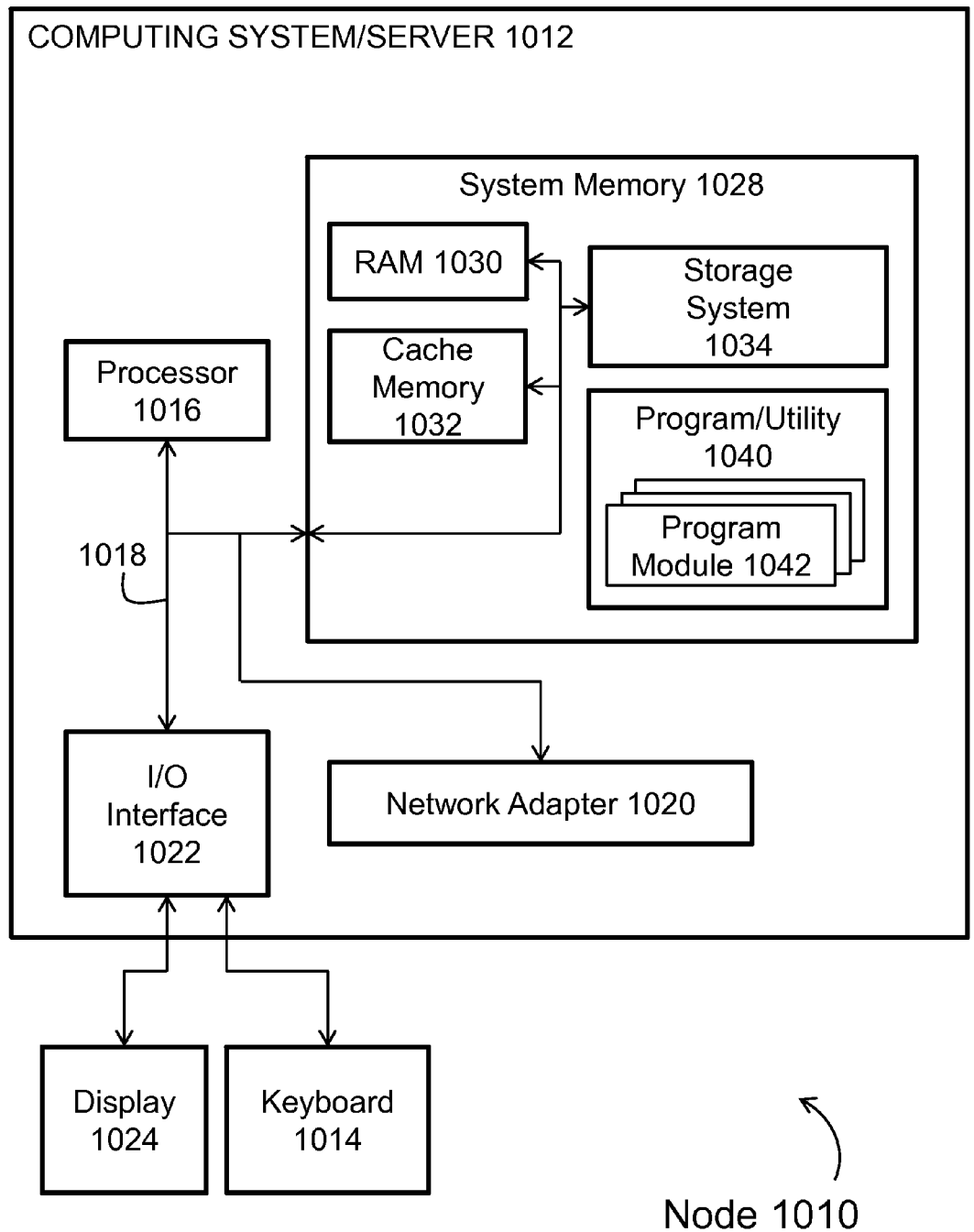
FIG. 10 depicts a cloud computing node according to an embodiment of the present invention.

Referring now to FIG. 10, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
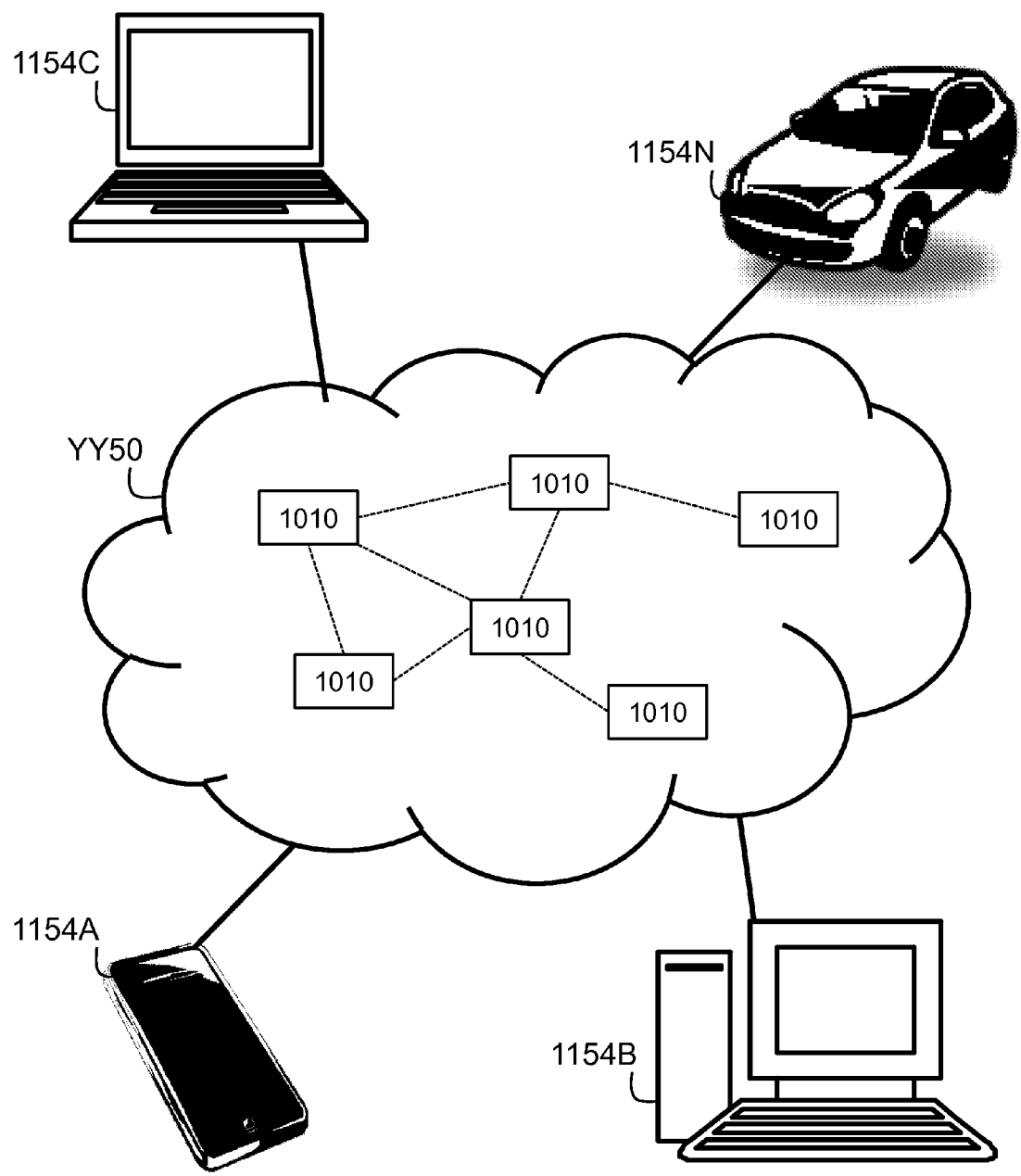
FIG. 11 depicts a cloud computing environment according to an embodiment of the present invention.

Referring now to FIG. 11, illustrative cloud computing environment 1150 is depicted. As shown, cloud computing environment 1150 comprises one or more cloud computing nodes 1010 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1010 and cloud computing environment 1150 can communicate with any type of computerized device over any type of network and/or network addressable connection (e.g., using a web browser).

Figure 12:
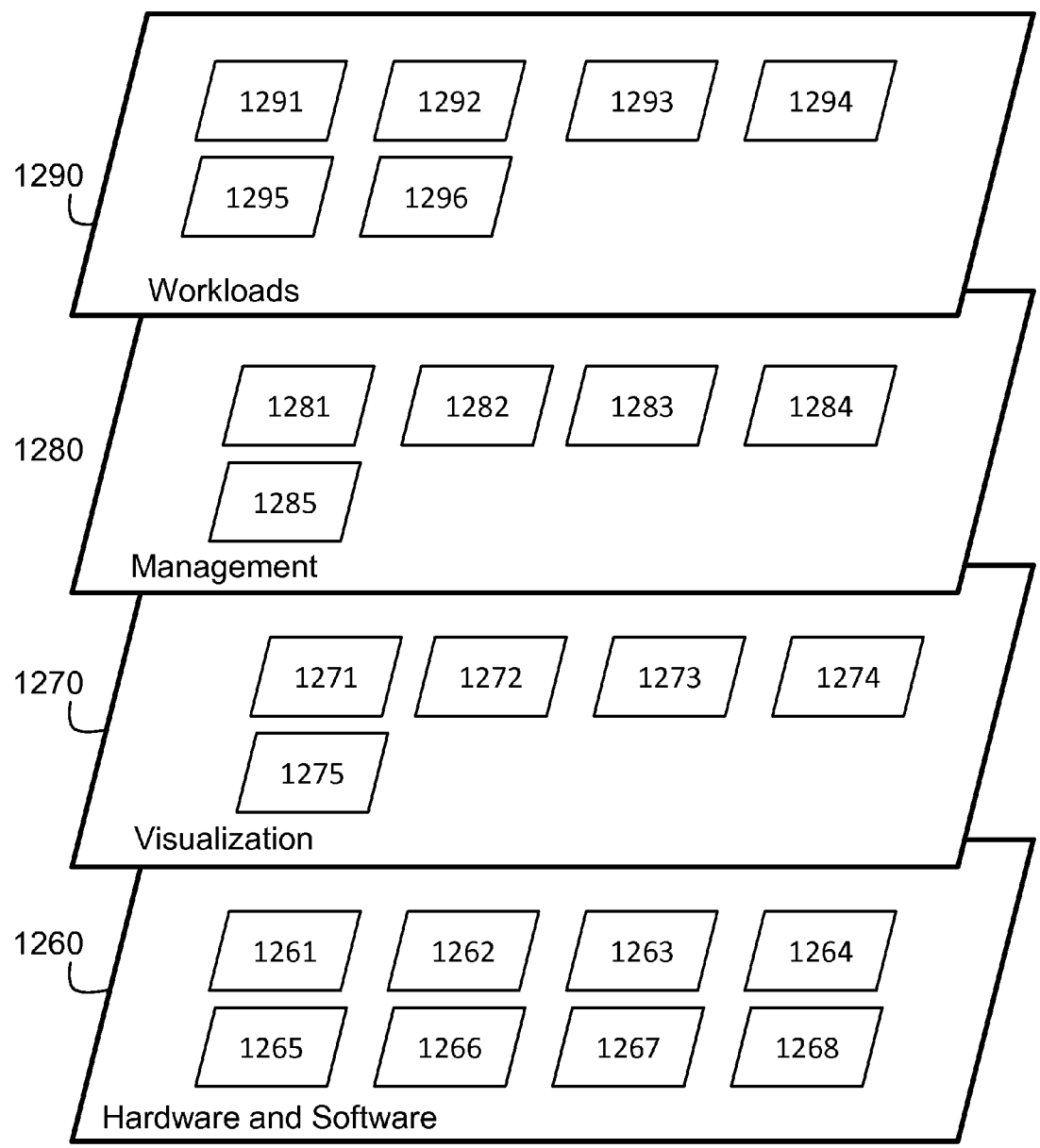
FIG. 12 depicts abstraction model layers according to an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and application workload optimization 1296.

In view of the above, an embodiment of the present invention can include a method, where the method includes emulating, characterizing and optimizing an application workflow that represents the real-time computation task encountered by a wirelessly connected cluster of mobile embedded systems, supported by a ground server system.

In another embodiment or according to the method embodiment above, an objective function in the optimization can be any user-specified composite metric consisting of power (energy), performance, and resilience components.

In another embodiment or according to any of the method embodiments above, the application workflow can include a plurality of individual applications that can be targeted for per-application optimization controls.

In another embodiment or according to any of the method embodiments above, the optimization can be done with any user-specified soft and/or hard failure rate limit constraints.

In another embodiment or according to any of the method embodiments above, a performance-related constraint can be a real-time execution deadline.

In another embodiment or according to any of the method embodiments above, an objective function can be any specified energy efficiency metric (e.g., Giga-operations per second, where "operations" can be user defined).

In another embodiment or according to any of the method embodiments above, applications of the application workflow can be organized as a directed acyclic graph.

In another embodiment or according to any of the method embodiments above, applications of the application workflow can be a linear dependence chain across the selected applications.

In another embodiment or according to any of the method embodiments above, the optimization can be at the time of static analysis, prior to actual run-time emulation.

In another embodiment or according to any of the method embodiments above, the optimization can be during the run-time emulation of the application workflow.

In another embodiment or according to any of the method embodiments above, a run-time emulation/optimization can encounter injected faults and per-application execution time deviations (e.g., uncertainties).

In another embodiment or according to any of the method embodiments above, the method can utilize on a per-application basis optimization controls. The optimization control can be one or more power-performance knobs, including but not limited to DVS, DFS, DVFS, PCPG, or other adaptive power-performance management control knobs.

In another embodiment or according to any of the method embodiments above, the method can include a "turbo" mode boosting of voltage-frequency levels for short intervals to enable meeting of real-time deadline controls, while violating hard fail rate (or maximum power) constraints for those short intervals, without affecting long term endurance or reliability targets of any mobile embedded system.

In another embodiment, a system or a computer program product is provided. The system or the computer program product can implement any of the method embodiments above.

Technical effects and benefits of embodiments of the present invention include controlling (or simulating the control of) a system of (wirelessly connected), cloud-backed mobile embedded systems through the optimization of application workflows, to ensure successful operations within stipulated criteria at a maximum power-performance efficiency (e.g., maximum Gigaflops per watt). Further, the technical effects and benefits of embodiments of the present invention include the ability to manipulate DVFS/other control settings and compiler optimization levels during the static "preparation" of a complex workflow, while addressing dynamic uncertainty in the field.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for optimizing an application workflow, comprising:
   a memory having computer readable instructions; and
   a processor for executing the computer readable instructions, the computer readable instructions including:
   characterizing the application workflow by determining at least one baseline metric related to an operational control knob of an embedded system processor, the application workflow configured to perform a real-time computational task encountered by at least one mobile embedded system of a wirelessly connected cluster of systems supported by a server system;

performing an optimization operation on at least one baseline metric of the application workflow while satisfying at least one runtime constraint; and outputting an annotated workflow, the annotated workflow being a result of the performing of the optimization operation.

2. The system of claim 1, wherein the optimization operation comprises a static preparation of the application workflow, the static preparation comprising:

characterizing the at least one baseline metric of the application workflow as a function of time; and optimizing the at least one baseline metric within the at least one runtime constraint.

3. The system of claim 2, wherein the static preparation executes a single optimization heuristic.

4. The system of claim 2, wherein the static preparation executes a linear optimization heuristic.

5. The system of claim 2, wherein the static preparation executes a structured direct acyclic graph optimization.

6. The system of claim 1, wherein the optimization operation comprises a dynamic optimization of the application workflow, the dynamic optimization comprising:

emulating a deployment environment of the mobile embedded systems; and optimizing the at least one baseline metric of the application workflow operating in the deployment environment within the at least one runtime constraint.

7. The system of claim 6, wherein the dynamic optimization executes a turbo-boost optimization, the turbo boost optimization comprising a boosting of voltage-frequency levels used for short intervals to meet a real-time deadline of the emulated deployment environment.

8. The system of claim 6, wherein the dynamic optimization comprises:

injecting per-application execution time deviations into the emulated deployment environment.

9. The system of claim 1, the computer readable instructions further including:

synthesizing a plurality of individual applications targeted for per-application optimization controls into a synthesized workflow based on the at least one runtime constraint, a plurality of metrics, hardware resource constraints of the mobile embedded systems, and software redundancy options; and receiving a synthesized workflow as the application workflow.

10. The system of claim 1, wherein the system is embodied in a software simulation-and-emulation framework comprising modules that include the memory and the processor.

11. The system of claim 1, wherein the at least one runtime constraint is a performance-related constraint of a real-time execution deadline.

12. The system of claim 1, wherein the optimization operation comprises adjusting a processor setting of one of the mobile embedded systems by changing a value of an adaptive power performance control knob, the processor setting corresponding to a baseline performance, a baseline power, or a baseline resilience of the one of the mobile embedded systems.

13. The system of claim 1, the computer readable instructions further including:

re-tuning the annotated workflow to factor in simulated run-time uncertainties caused by the operational environment of said embedded system processor.

14. The system of claim 1, wherein the optimization operation comprises a guard mechanism to minimize a number of failures during the optimization operation, wherein each failure represents an inability by the optimization operation to find an optimization solution within the at least one runtime constraint.

15. A computer program product for optimizing an application workflow, the computer program product comprising a computer readable storage medium having program instructions embodied therewith, the program instructions executable by a processor to cause the processor to perform operations comprising:

characterizing the application workflow by determining at least one baseline metric related to an operational control knob of an embedded system processor, the application workflow configured to perform a real-time computational task encountered by at least one mobile embedded system of a wirelessly connected cluster of systems supported by a server system;

performing an optimization operation on at least one baseline metric of the application workflow while satisfying at least one runtime constraint; and outputting an annotated workflow, the annotated workflow being a result of the performing of the optimization operation.

16. The computer program product of claim 15, wherein the optimization operation comprises a static preparation of the application workflow, the static preparation comprising:

characterizing the at least one baseline metric of the application workflow as a function of time; and optimizing the at least one baseline metric within the at least one runtime constraint.

17. The computer program product of claim 16, wherein the static preparation executes a single optimization heuristic.

18. The computer program product of claim 16, wherein the static preparation executes a linear optimization heuristic.

19. The computer program product of claim 16, wherein the static preparation executes a structured direct acyclic graph optimization.

20. The computer program product of claim 15, wherein the optimization operation comprises a dynamic optimization of the application workflow, the dynamic optimization comprising:

emulating a deployment environment of the mobile embedded systems; and optimizing the at least one baseline metric of the application workflow operating in the deployment environment within the at least one runtime constraint.

* * * * *